(12) United States Patent
Pennoyer, Jr.

(10) Patent No.: US 6,178,604 B1
(45) Date of Patent: Jan. 30, 2001

(54) CLOTHESLINE LINE TIGHTENER

(76) Inventor: Raymond P. Pennoyer, Jr., 97 Sturbridge La., Trumbull, CT (US) 06611

( * ) Notice: Under 35 U.S.C. 154(b), the term of this patent shall be extended for 0 days.

(21) Appl. No.: 09/218,397

(22) Filed: Dec. 22, 1998

Related U.S. Application Data

(63) Continuation-in-part of application No. 08/901,098, filed on Jul. 28, 1997, now Pat. No. 5,852,853, which is a continuation-in-part of application No. 29/085,591, filed on Mar. 26, 1998, now Pat. No. Des. 408,714.

(51) Int. Cl.[7] ................................................. B63B 21/04
(52) U.S. Cl. ............................................................ 24/134 P
(58) Field of Search ........................... 24/132 R, 134 R, 24/712.6, 134 P, 134 KB; 114/218; 188/65.1

(56) References Cited

U.S. PATENT DOCUMENTS

| | | | |
|---|---|---|---|
| D. 21,627 | 6/1892 | Meeker | D8/366 |
| D. 371,861 | 7/1996 | Stamm | D8/354 X |
| 749,760 | 1/1904 | Townsend . | |
| 881,041 * | 3/1908 | Almstead . | |
| 1,070,955 | 8/1913 | Glenn . | |
| 1,520,716 | 12/1924 | Judd . | |
| 1,727,687 | 9/1929 | Agobian . | |
| 2,060,628 * | 11/1936 | McCormick . | |
| 2,262,162 * | 11/1941 | Bock . | |
| 2,315,196 | 3/1943 | Gallione . | |
| 2,608,731 * | 9/1952 | Summers . | |
| 3,628,221 * | 12/1971 | Pasbrig . | |
| 3,730,129 | 5/1973 | Helms | 114/218 |
| 3,765,061 | 10/1973 | Nash | 24/134 |
| 4,620,499 | 11/1986 | Slemmons | 114/218 |
| 4,724,643 | 2/1988 | Marsh | D8/382 X |
| 4,791,237 * | 12/1988 | Sherman . | |
| 4,843,687 | 7/1989 | Kroepelin, Jr. | 24/134 |
| 4,956,897 | 9/1990 | Speedie | 24/134 |
| 5,345,656 | 9/1994 | Merrit . | |

* cited by examiner

Primary Examiner—James R. Brittain
(74) Attorney, Agent, or Firm—Perman & Green, LLP

(57) ABSTRACT

A clothesline connector for connecting two ends of a clothesline to each other to form a loop. The connector has a frame and two spring loaded gripping members. The frame is a two piece assembly having a top piece ultrasonically welded to top ends of pivot posts on a bottom piece. The gripping members are pivotably mounted on the pivot posts and have finger contact sections. A user can move the finger contact sections towards each other with a single hand to open a path between the two gripping members.

12 Claims, 3 Drawing Sheets

CLOTHESLINE LINE TIGHTENER

CROSS-REFERENCE TO RELATED APPLICATION

This is a continuation-in-part patent application of U.S. application Ser. No. 08/901,098 filed Jul. 28, 1997, now U.S. Pat. No. 5,852,853; and U.S. application Ser. No. 29/085,591 filed Mar. 26, 1998, now U.S. Pat. No. Des. 408,714.

BACKGROUND OF THE INVENTION

1. Field of the Invention

The present invention relates to a clamp for a cord.

2. Prior Art

U.S. Pat. No. 3,765,061 discloses a clamp cleat with two cam members spring loaded towards each other by coil springs. U.S. Pat. No. 2,315,196 discloses a pair of spring loaded movable jaws with extensions to manually move the jaws away from each other.

SUMMARY OF THE INVENTION

In accordance with one embodiment of the present invention a clothesline connector is provided for connecting two ends of a clothesline to each other to form a loop. The clothesline connector comprises a first connection area and a second connection area. The first connection area is adapted to fixedly connect a first one of the ends of the clothesline to the connector. The second connection area is for adjustably connecting a second one of the ends of the clothesline to the connector. The second connection area has a through hole enclosed on all sides except an entry and an exit for axially longitudinally inserting the second end into the second connection area. The first connection area is coaxially aligned with the through hole.

In accordance with another embodiment of the present invention a cord clamp is provided comprising a frame and two gripping members. The frame has a first frame member with a first cord connection area and two pivot posts. The two gripping members are pivotally mounted on the pivot posts forming a second cord connection area with a channel to axially longitudinally pass an end of a cord therethrough and grip the cord directly between the two gripping members. The first frame member is shaped to align the first cord connection area at an end of a path of insertion of the cord through the channel to thereby align the first cord connection area with the channel.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1:
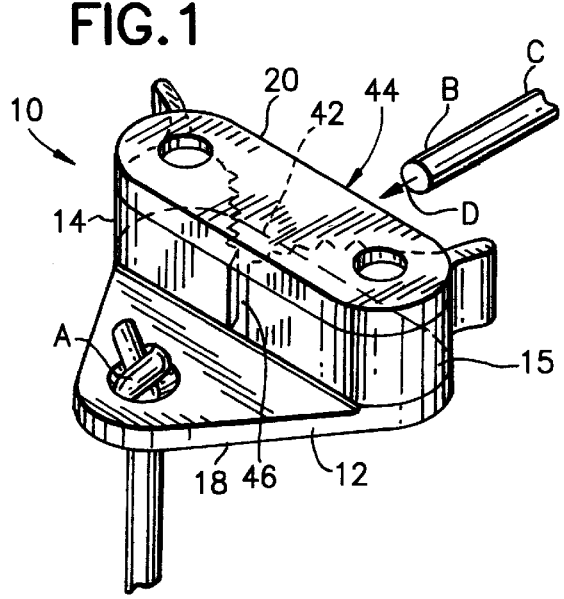
FIG. 1 is a perspective view of a clothesline connector incorporating features of the present invention and two ends of a clothesline.

Referring to FIG. 1, there is shown a perspective view of a connector 10 incorporating features of the present invention. Although the present invention will be described with reference to the embodiments shown in the drawings, it should be understood that features of the present invention could be embodied in many different types of alternative embodiments. In addition, any suitable size, shape or type of elements or materials could be used.

Figure 2:
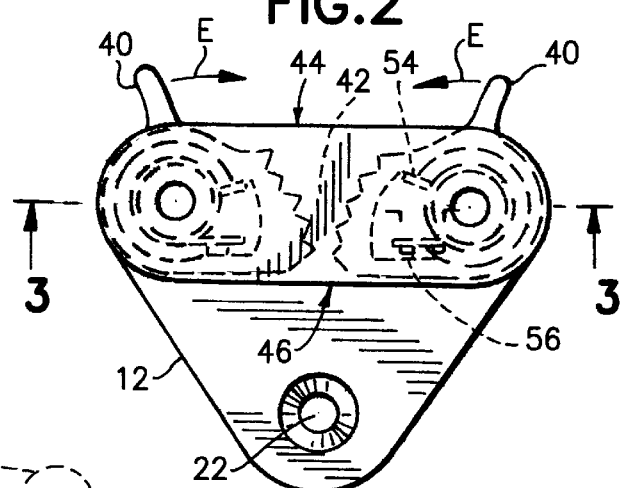
FIG. 2 is a top plan view of the connector shown in FIG. 1.
Figure 3:
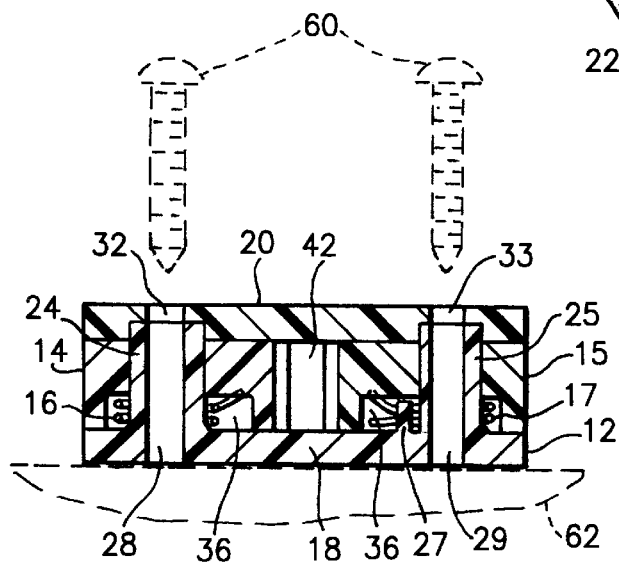
FIG. 3 is a cross sectional view of the connector shown in FIG. 2 taken along line 3—3.
Figure 4:
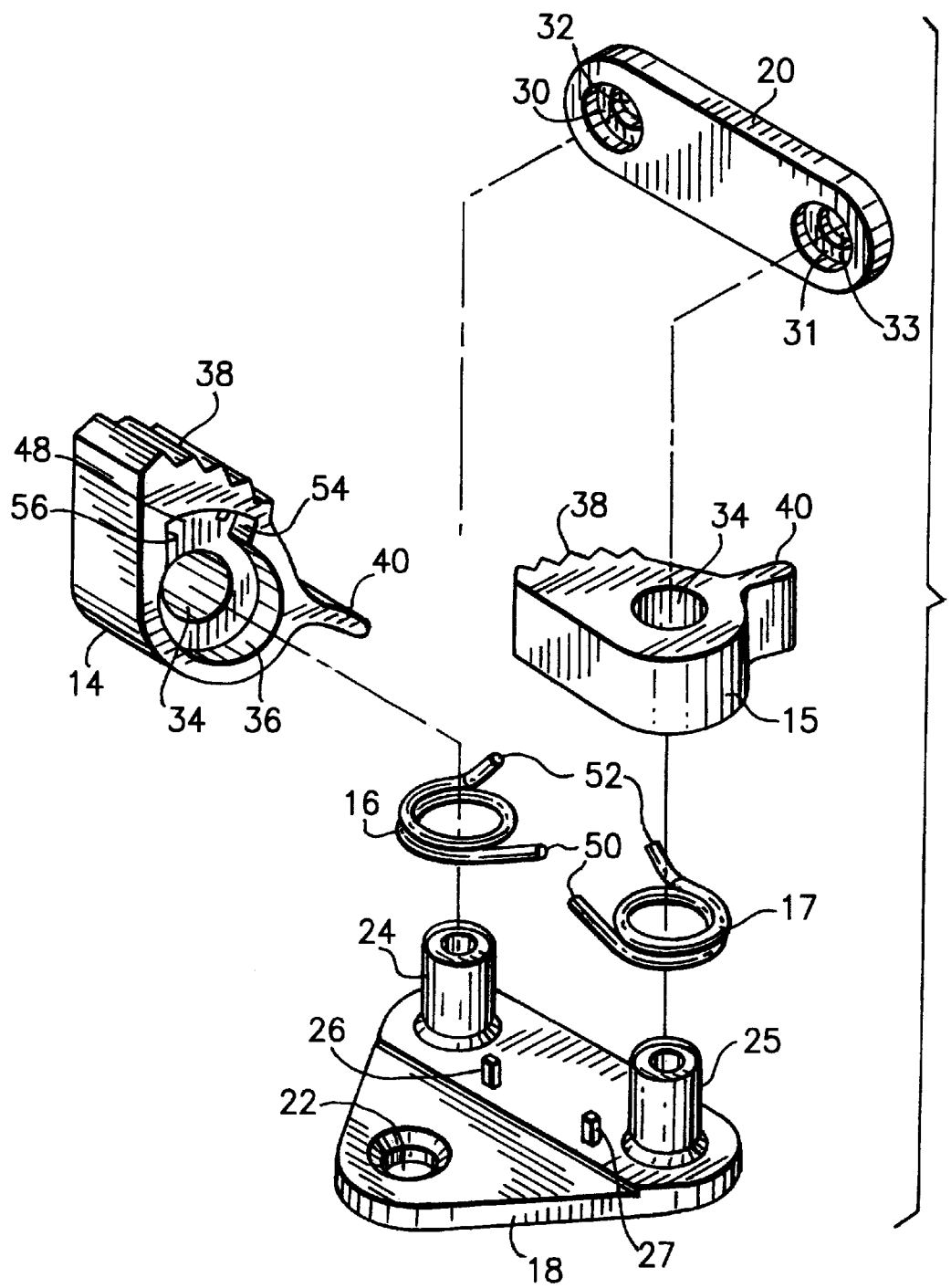
FIG. 4 is an exploded perspective view of the connector shown in FIG. 1.

The connector 10 is adapted to connect two ends A, B of a clothesline C to each other to form a clothesline loop. Referring also to FIGS. 2–4, the connector 10 generally comprises a frame 12, two pawls or gripping member 14, 15 and two coil springs 16, 17. The frame 12 is comprised of two one-piece members preferably made of a polymer or plastic material; a first bottom frame member 18 and a second top frame member 20. The bottom frame member 18 has a general triangular shaped base section with a through-hole 22, two pivot posts 24, 25 and two spring posts 26, 27. The front of the bottom frame member 18 having the through-hole 22 forms a first connector area adapted to fixedly connect the first end A of the clothesline to the connector 10. In alternate embodiments, other types of first connection areas could be provided. However, the through-hole 22 is preferred because it is integrally formed with the bottom frame member 18 without any additional parts. The first end A can be knotted as shown to prevent pull-through of the end through the hole 22 or tied onto the front end of the bottom frame member 18. The rear end of the bottom frame member 18, in combination with the other members of the connector, forms a second connection area adapted to adjustably connect the second end B of the clothesline C to the connector 10. The two pivot posts 24, 25 have holes 28, 29. The top frame member 20 has two recesses 30, 31 and holes 32, 33. The top ends of the pivot posts 24, 25 are received in the recesses 30, 31 such that the holes 28, 29 and 32, 33 are aligned. This forms two through-holes through the posts 24, 25 for mounting fasteners 60 (see FIG. 3) to connect the connector 10 to another member 62 (see FIG. 3) if desired. Preferably, the top and bottom frame members are ultrasonically welded together. However, additional or alternative means could be provided to fixedly connect the two frame members together.

The two pawls 14, 15 are essentially mirror images of each other. Each pawl has a hole 34, a bottom recess 36, a gripping surface 38, and a finger contact projection 40. The pawls 14, 15 are rotatably mounted on their respective pivot posts 24, 25 with the posts being received in the holes 34. The top frame piece 20 keeps the pawls 14, 15 retained on the pivot posts 24, 25. The two gripping surface 38 face each other and form a gripping area 42 therebetween.

The gripping area 42 is formed as a through-hole by the pawls 14, 15 and two frame members 18, 20. This through-hole is enclosed on all sides except an entry 44 and an exit 46. As seen by arrow D in FIG. 1, because the gripping area 42 is substantially enclosed, except for the entry 44 and the exit 46, the second end B of the clothesline C must be axially longitudinally inserted into the gripping area 42 in order to be gripped.

The two coil springs 16, 17 are located in respective ones of the bottom recesses 36 in the pawls 14, 15. The coil springs 16, 17 are mounted around the pivot posts 24, 25 and have projecting ends. The recesses 36 are generally circular, but include an extension section 48. The projecting ends of the coil springs 16, 17 are located in the extension sections 48. A first end 50 of each coil spring is located against one side of its respective spring post 26, 27. A second end 52 of each spring is located against a side wall 54 in the extension section 48. The second ends 52 have a 30° bend to insure good contact with the side wall 54. The opposite side wall 56 in the extension section 48 is biased by the springs against the spring posts 26, 27. Thus, the spring posts 26, 27, in addition to functioning as a locator for the first ends 50 of the springs 16, 17, also function as a limit or stop for limiting rotational movement of the pawls 14, 15 on the frame 12.

The connector 10 can be used to connect the two ends A, B of the clothesline to each other. The first end A is connected to the front of the frame 12 at the hole 22. The second end B is inserted as shown by arrow D in FIG. 1 into the gripping area 42. The two pawls 14, 15 spread apart by rotating on their pivot posts 24, 25 to allow the second end B to pass through the gripping area. The user can then pull the second end B through the exit 46 to make the clothesline loop taunt. The springs 16, 17 bias the gripping surfaces 38 against the clothesline C to fixedly capture the clothesline therebetween. Because the frame 12 encloses the top and bottom sides of the gripping area 42, the clothesline can only be removed from the gripping area by moving the gripping surfaces 38 apart and then withdrawing the second end B in a direction reverse to the direction D. The finger contact projections 40 have been provided, extending from the rear end of the frame, to allow a user to accomplish this. With a single hand, a user can move the two projections 40 towards each other as indicated by arrows E in FIG. 2. This pivots the two pawls 14, 15 to enlarge the gripping area 42. The projections 40 can also be used to enlarge the gripping area 42 when initially inserting the second end B into the gripping area. The clothesline C can be tightened by pulling on second end B, sliding through the area 42, and the springs 16, 17 then causing the surfaces 38 to grip the clothesline C therebetween to prevent inadvertent withdrawal. Thus, the connector 10 functions both as a connector and as an easy to use line tightener.

In addition to being used as a clothesline connector and line tightener, the connector 10 could be used to connect or clamp two ends of any suitable cords or ropes. In addition, the connector 10 could be stationarily connected to another member and used as a clamp or cleat. This is illustrated by broken lines in FIG. 3. Two fasteners 60 can be inserted in the holes 28, 32 and 29, 33 to attach to a member 62. A third fastener (not shown) could be inserted in the hole 22 and connected to the member 62. Other types of connections of the connector 10 to members other than the line or card could also be provided.

Figure 5:
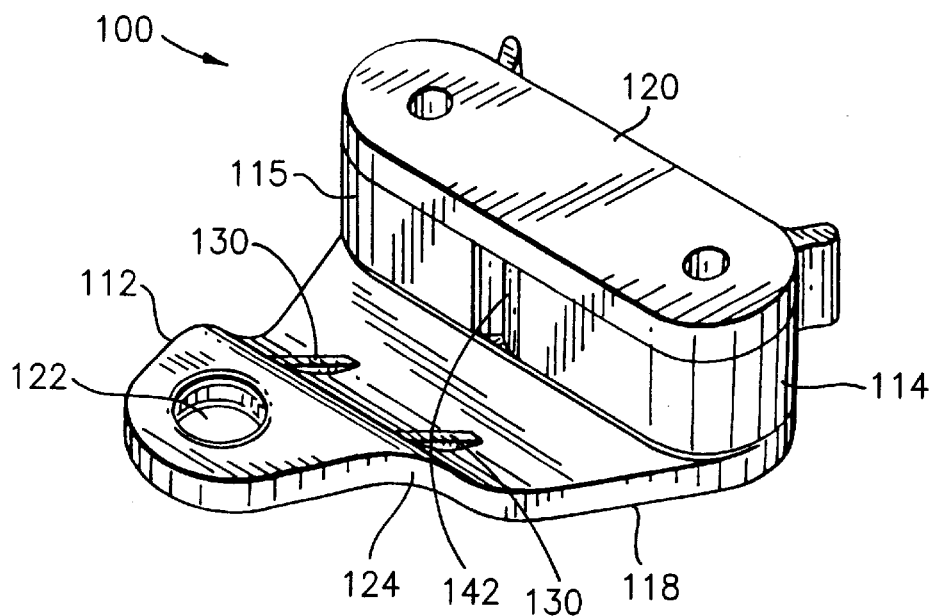
FIG. 5 is a perspective view of an alternate embodiment of the present invention.

Referring now to FIG. 5, a perspective view of an alternate embodiment of the connector is shown. In this embodiment the connector 100 generally comprises a frame 112 and two spring loaded pawls 114, 115. The frame 112 has a bottom frame member 118 and a top frame member 120. The bottom frame member 118 has a through-hole 122 and two pivot posts. The pawls 114, 115 are pivotably mounted on the pivot posts. The through-hole 122 forms a first connection area for connecting a first end of a cord. An area 142 between the two pawls 114, 115 forms a second connection area for connecting a second end of a cord. The connector 100 is substantially the same as the connector 10 shown in FIGS. 1–4 except for the bottom frame member 118.

Figure 6:
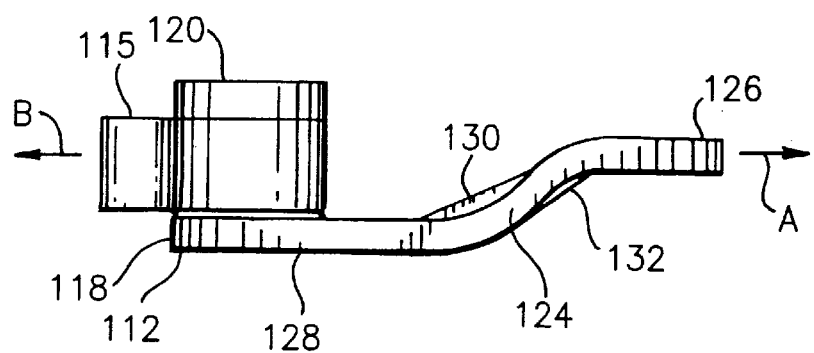
FIG. 6 is an elevational side view of the connector shown in FIG. 5.

Referring also to FIG. 6, the bottom frame member 118, is a one-piece member which has a bent section 124 located between two flat sections 126, 128. The two flat sections 126, 128 are generally parallel and offset relative to each other. The pivot posts extend from the rear flat section 128. The hole 122 is in the front flat section 126. The bend section 124 has a general elongated "S" shape and includes stiffening ribs 130,132 on its top and bottom sides. The bent section 124 allows the first connection area with the hole 122 to be generally coaxially aligned with the through-hole between the pawls 114, 115 of the second connection area 142. Thus, forces A, B exerted by opposite ends of the cord at the two connection areas, are aligned with each other to prevent the connector from canting. Thus, the pawls 114, 115 can exert maximum gripping force on the cord with their teeth aligned perpendicular to the path of the cord through the second connection area 142. In alternate embodiments the bottom frame member or frame could have any suitable shape to align the two connection areas with each other.

It should be understood that the foregoing description is only illustrative of the invention. Various alternative and modifications can be devises by those skilled in the art without departing from the invention. Accordingly, the present invention is intended to embrace all such alternative, modifications and variances which fall within the scope of the appended claims.

What is claimed is:

1. A clothesline connector for connecting two ends of a clothesline to each other to form a loop, the clothesline connector comprising:
   a first connection area adapted to fixedly connect a first one of the ends of the clothesline to the connector;
   a second connection area for adjustably connecting a second one of the ends of the clothesline to the connector, the second connection area having a through-hole enclosed on all sides except an entry and an exit for axially longitudinally inserting the second end into the second connection area,
   wherein the first connection area is coaxially aligned with the through-hole; and
   at least one spring biased gripping member disposed in said second connection area.

2. A clothesline connector as in claim 1 wherein the connector comprises a bottom frame member which forms portions of both the first and second connection areas.

3. A clothesline connector as in claim 2 wherein the bottom frame member has a bent section.

4. A clothesline connector as in claim 3 wherein the bottom frame member has two parallel and offset flat sections on opposite sides of the bent section.

5. A clothesline connector as in claim 3 wherein the bottom frame member has structural reinforcing ribs on opposite sides of the bent section.

6. A clothesline connector as in claim 3 wherein the bent section has an elongated "S" shape.

7. A clothesline connector as in claim 1 wherein the connector comprises a frame having a bottom frame member with two pivot posts having two gripping members pivotally mounted thereon.

8. A cord clamp comprising:
   a frame having a first frame member with a first cord connection area and two pivot posts; and
   two gripping members pivotably mounted on the two pivot posts forming a second cord connection area with a channel to axially longitudinally pass an end of a cord therethrough and grip the cord directly between the two gripping members, said gripping members being individually spring biased;
   wherein the first frame member is shaped to align the first cord connection area at an end of a path of insertion of the cord through the channel to thereby align the first cord connection area with the channel.

9. A cord clamp as in claim 8 wherein the frame member has a bent section.

10. A cord clamp as in claim 9 wherein the frame member has two parallel and offset flat sections on opposite sides of the bent section.

11. A cord clamp as in claim 9 wherein the frame member has structural reinforcing ribs on opposite sides of the bent section.

12. A cord clamp as in claim 9 wherein the bent section has an elongated "S" shape.

* * * * *